US012597106B2

(12) United States Patent
Zhou et al.

(10) Patent No.: US 12,597,106 B2
(45) Date of Patent: Apr. 7, 2026

(54) METHOD AND APPARATUS FOR IDENTIFYING DEFECT GRADE OF BAD PICTURE, AND STORAGE MEDIUM

(71) Applicant: BOE Technology Group Co., Ltd., Beijing (CN)

(72) Inventors: Quanguo Zhou, Beijing (CN); Kaiqin Xu, Beijing (CN); Jiahong Zou, Beijing (CN); Guolin Zhang, Beijing (CN); Xun Huang, Beijing (CN); Qing Zhang, Beijing (CN); Lijia Zhou, Beijing (CN); Zhidong Wang, Beijing (CN); Hongxiang Shen, Beijing (CN); Hao Tang, Beijing (CN); Jiuyang Cheng, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 380 days.

(21) Appl. No.: 18/038,197

(22) PCT Filed: Nov. 26, 2020

(86) PCT No.: PCT/CN2020/131918
§ 371 (c)(1),
(2) Date: May 22, 2023

(87) PCT Pub. No.: WO2022/109949
PCT Pub. Date: Jun. 2, 2022

(65) Prior Publication Data
US 2023/0419466 A1 Dec. 28, 2023

(51) Int. Cl.
*G06T 7/00* (2017.01)
*G01N 21/88* (2006.01)
*G06T 3/40* (2024.01)

(52) U.S. Cl.
CPC .............. *G06T 7/0002* (2013.01); *G06T 3/40* (2013.01); *G06T 2207/20084* (2013.01); *G06T 2207/30168* (2013.01)

(58) Field of Classification Search
CPC .................... G06T 7/0002; G06T 3/40; G06T 2207/20084; G06T 2207/30168; G06T 2207/30121; G06T 7/0004; G01N 21/88
See application file for complete search history.

(56) References Cited

U.S. PATENT DOCUMENTS

| 2019/0086340 A1 | 3/2019 | Leu | |
| 2020/0026819 A1* | 1/2020 | Leu | G06F 30/398 |
| 2020/0384693 A1* | 12/2020 | Bennett | B33Y 50/02 |

FOREIGN PATENT DOCUMENTS

| CN | 103698334 A | * | 4/2014 |
| CN | 107941812 A | | 4/2018 |

(Continued)

OTHER PUBLICATIONS

PCT/CN2020/131918 international search report.

*Primary Examiner* — Amandeep Saini
*Assistant Examiner* — Andrew S Budisalich
(74) *Attorney, Agent, or Firm* — IPro, PLLC

(57) ABSTRACT

Provided are a method and apparatus for identifying the defect grade of a bad picture, and a storage medium. The method includes: determining the defect size of a defect from a bad picture; according to a product model corresponding to the bad picture, determining the design size of a pattern corresponding to a component that is adjacent to the position of the defect; determining the defect grade of the defect according to the defect type of the defect and a magnitude relationship between the defect size and the design size, wherein the defect grade is the degree to which the defect affects product yield.

12 Claims, 5 Drawing Sheets

(56) References Cited

FOREIGN PATENT DOCUMENTS

| CN | 109741324 A | 5/2019 |
| CN | 110690133 A | 1/2020 |

* cited by examiner

METHOD AND APPARATUS FOR IDENTIFYING DEFECT GRADE OF BAD PICTURE, AND STORAGE MEDIUM

CROSS REFERENCE TO RELATED APPLICATIONS

The present disclosure is a US National Stage of International Application No. PCT/CN2020/131918, filed on Nov. 26, 2020, the entire contents of which are incorporated herein by reference.

FIELD

The present disclosure relates to the field of image recognition, and in particular, to a method and apparatus for identifying a defect grade of a bad picture, and a storage medium.

BACKGROUND

In the process of producing a backplane of a display panel, the procedures such as thin film deposition, photo, developed etching, and the like are generally included.

In the production process, the display panel is highly susceptible to defects in the manufacturing process due to factors such as manufacturing equipment, manufacturing processes, process environment, process materials, pixel layout design, and the like. These defects, in turn, can greatly affect the product yield, resulting in increased production costs.

Currently, during production of a backplane of a display panel, it is possible to detect defects occurring in various processes of a product by Auto Optical Inspection (AOI), and capture a bad picture containing the defects.

After that, from each type of bad pictures, bad pictures having a substantial effect on product yield are determined manually, which often leads to omissions, misjudgments and other problems. Moreover, manual picture judgment still has some problems, such as long time-consuming, low efficiency, inability to give bad warning in time, and reduction of maintenance of key processes.

In view of this, how to quickly and accurately judge a bad picture that has a substantial impact on product yield becomes a technical problem that is urgently addressed.

SUMMARY

The present disclosure provides a method and apparatus for identifying a defect grade of a bad picture, and a storage medium, to solve the technical problem existing in the related art that bad pictures having a substantial impact on product yield cannot be quickly and accurately determined.

In a first aspect, to solve the above technical problem, a technical solution of a method for identifying a defect grade of a bad picture provided by an embodiment of the present disclosure includes: determining a defect size of a defect from the bad picture:according to a product model corresponding to the bad picture, determining a design size of a pattern corresponding to a component that is adjacent to a position of the defect; and determining the defect grade of the defect according to a defect type of the defect and a magnitude relationship between the defect size and the design size, wherein the defect grade is a degree to which the defect affects product yield.

In a possible implementation mode, the determining the defect size of the defect from the bad picture, includes:

determining a maximum length of the defect in a first direction and a second direction as the defect size, wherein the first direction is perpendicular to the second direction.

In a possible implementation mode, the determining defect grade of the defect according to the defect type of the defect and the magnitude relationship between the defect size and the design size, includes: determining, the defect type of the defect by a neural network model in an automatic defect classification system, and determining a determination condition of the defect grade used for the defect: obtaining a determination result by comparing a ratio of the defect size to the design size with a set magnification according to the determination condition; and determining the defect grade according to the determination result.

In a possible implementation mode, in a case that the bad picture is a bad picture in a display panel, the defect type includes a particle defect and a passivation open defect.

In a possible implementation mode, the determining the defect type of the defect by the neural network model in the automatic defect classification system, and determining the determination condition of the defect grade used for the defect, includes: in a case that the defect type is the particle defect, determining to use a determination condition of the particle defect for the bad picture, wherein a value of the set magnification ranges from 1.3 to 1.7; and in a case that the defect type is the passivation open defect, determining to use a determination condition of the passivation open defect for the bad picture, wherein a value of the set magnification ranges from 0.8 to 1.2.

In a possible implementation mode, the determination condition of the particle defect includes: in a case that a pattern around the position of the defect is a channel of a thin film transistor, if a ratio of the defect size to a design size of the channel is less than or equal to the set magnification, determining that the defect grade is bad with quality risk; if the ratio of the defect size to the design size of the channel is greater than the set magnification, determining that the defect grade is bad without quality risk; and in a case that a pattern around the position of the defect is a pattern corresponding to an intersection of gate lines and data lines of the display panel, if the defect is black and a ratio of the defect size to a design size of the intersection is less than or equal to the set magnification, determining that the defect grade is bad with quality risk; if the ratio of the defect size to the design size of the intersection is greater than the set magnification, determining that the defect grade is bad without quality risk.

In a possible implementation mode, the determination condition of the passivation open defect includes: when a pattern around the position of the defect is a pattern corresponding to data lines in the display panel, if a ratio of the defect size to a design spacing between two adjacent data lines is less than or equal to the set magnification, determining that the defect grade is bad and repairable; and if a ratio of the defect size to the design spacing between the two adjacent data lines is greater than the set magnification, determining that the defect grade is bad and unrepairable.

In a possible implementation mode, after determining the defect grade of the bad picture, the method further includes: labeling defects of different defect grades with different labels.

In a second aspect, an embodiment of the present disclosure provides an apparatus for identifying a defect grade of a bad picture, including: a defect size determining element configured for determining a defect size of a defect from the bad picture: a design size determining element configured for according to a product model corresponding to the bad picture, determining a design size of a pattern corresponding to a component that is adjacent to a position of the defect; and a defect grade determining element configured for determining the defect grade of the defect according to a defect type of the defect and a magnitude relationship between the defect size and the design size, wherein the defect grade is a degree to which the defect affects product yield.

In a possible implementation mode, the defect size determining element is configured for: determining a maximum length of the defect in a first direction and a second direction as the defect size, wherein the first direction is perpendicular to the second direction.

In a possible implementation mode, the defect grade determining element is configured for: determining the defect type of the defect by a neural network model in an automatic defect classification system, and determining a determination condition of the defect grade used for the defect; obtaining a determination result by comparing a ratio of the defect size to the design size with a set magnification according to the determination condition; and determining the defect grade according to the determination result.

In a possible implementation mode, in a cast that the bad picture is a bad picture in a display panel, the defect type includes a particle defect and a passivation open defect.

In a possible implementation mode, the defect grade determining element is further configured for: in a case that the defect type is the particle defect, determining to use a determination condition of the particle defect for the bad picture, where a value of the set magnification ranges from 1.3 to 1.7; and in a case that the defect type is the passivation open defect, determining to use a determination condition of the passivation open defect for the bad picture, where a value of the set magnification ranges from 0.8 to 1.2.

In a possible implementation mode, the determination condition of the particle defect includes: in a case that a pattern around the position of the defect is a pattern corresponding to a channel of a thin film transistor, if a ratio of the defect size to a design size of the channel is less than or equal to the set magnification, determining that the defect grade is bad with quality risk; if the ratio of the defect size to the design size of the channel is greater than the set magnification, determining that the defect grade is bad without quality risk; and in a case that a pattern around the position of the defect is a pattern corresponding to an intersection of gate lines and data lines of the display panel, if the defect is black and a ratio of the defect size to a design size of the intersection is less than or equal to the set magnification, determining that the defect grade is bad with quality risk; if the ratio of the defect size to the design size of the intersection is greater than the set magnification, determining that the defect grade is bad without quality risk.

In a possible implementation mode, the determination condition of the PVX Open defect includes: when a pattern around the position of the defect is a pattern corresponding to data lines in the display panel, if a ratio of the defect size to a design spacing between two adjacent data lines is less than or equal to the set magnification, determining that the defect grade is bad and repairable; and if a ratio of the defect size to the design spacing between the two adjacent data lines is greater than the set magnification, determining that the defect grade is bad and unrepairable.

In a possible implementation mode, the defect grade determining element is further configured for: labeling defects of different defect grades with different labels.

Based on the same inventive concept, an apparatus for automatically identifying a defect grade of a bad picture is provided in an embodiment of the present disclosure, including: at least one processor, and a memory connected with the at least one processor: where the memory stores instructions that are executable by the at least one processor and the at least one processor performs the method for identifying the defect grade of the bad picture by executing the instructions stored in the memory.

In a third aspect, an embodiment of the present disclosure also provides an apparatus for identifying a defect grade of a bad picture, including: at least one processor, and a memory connected with the at least one processor: where the memory stores instructions that are executable by the at least one processor and the at least one processor performs the method of the first aspect described above by executing the instructions stored in the memory.

In a fourth aspect, an embodiment of the disclosure also provides a readable storage medium including: a memory, being configured for storing instructions that, when executed by a processor, cause an apparatus including the readable storage medium to perform the method according to the first aspect described above.

DETAILED DESCRIPTION OF THE EMBODIMENTS

Embodiments of the present disclosure provide a method and apparatus for identifying a defect grade of a bad picture and a storage medium to address the technical problem existing in the related art of not being able to determine a bad picture having a substantial impact on product yield quickly and accurately.

In order to better understand the above-mentioned technical solution, the following detailed description of the technical solution of the present disclosure will be made with reference to the drawings and specific embodiments. It should be understood that the embodiments and specific features in the embodiments of the present disclosure are detailed explanations of the technical solution of the present disclosure and are not limitations of the technical solution of the present disclosure, and that the embodiments and the technical features in the embodiments of the present disclosure can be combined with each other without conflict.

Figure 1:
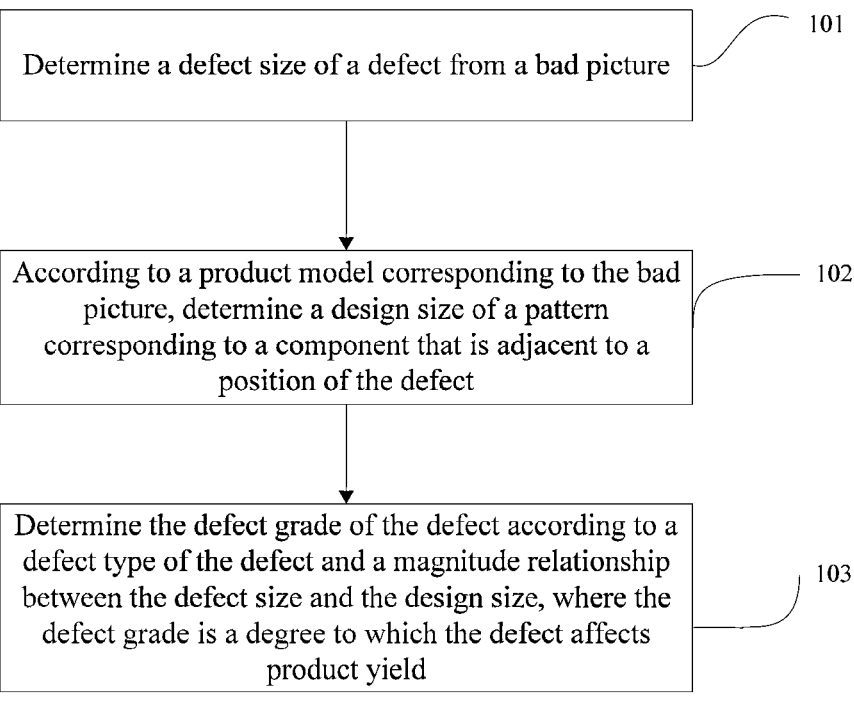
FIG. 1 is a flow diagram of bad picture defect grade identification according to an embodiment of the present disclosure.

Referring to FIG. 1, an embodiment of the present disclosure provides a method for identifying a defect grade of a bad picture, the process of which is as follows.

S101: a defect size of a defect is determined from the bad picture.

After obtaining the bad picture, a maximum length of the defect in a first direction and a second direction is determined as the defect size. The first direction is perpendicular to the second direction.

Figure 2:
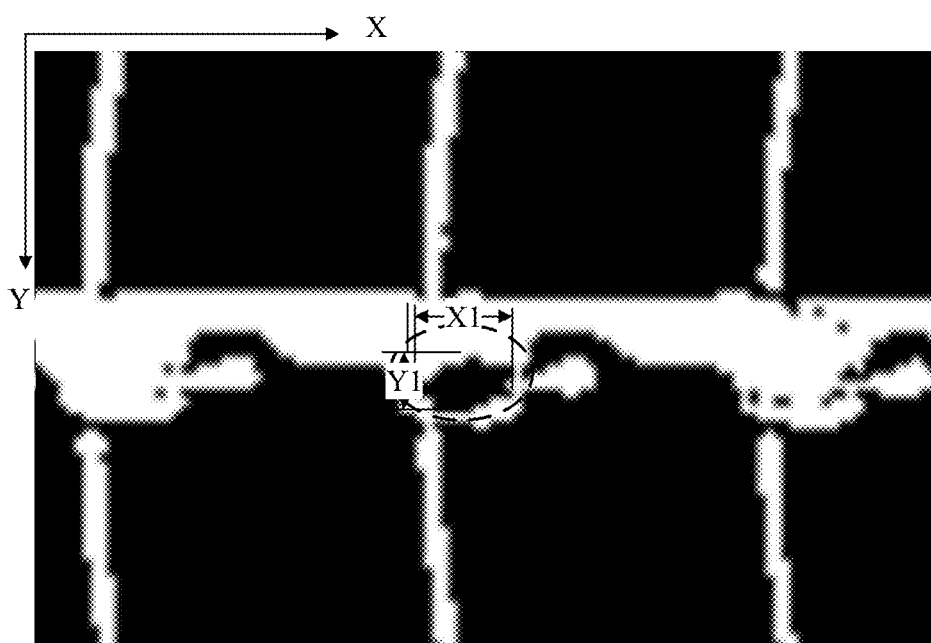
FIG. 2 is a schematic diagram of determining a defect size of a defect from a bad picture according to an embodiment of the present disclosure.

Referring to FIG. 2, which is a schematic diagram of determining a defect size of a defect from a bad picture according to an embodiment of the present disclosure. The defect in FIG. 2 is a particle (PT) defect as indicated by the black continuous area within the dashed area in FIG. 2, and the maximum length of the PT defect is X1 in a first direction (X) shown in FIG. 2, and the maximum length of the PT defect is Y1 in a second direction (Y) shown in FIG. 2, and the larger one of X1 and Y1 is determined as the defect size of the PT defect.

After the defect length of the defect is determined, S102 is performed.

S102: according to a product model corresponding to the bad picture, the design size of a pattern corresponding to a component that is adjacent to a position of the defect is determined.

The pattern corresponding to the component that is adjacent to the position of the defect may be, for example, a pattern corresponding to a component of a device, wiring, a film layer, or the like around the defect in a detected product (e.g., a display panel, a circuit board, or a chip).

For example, when the detected product is a display panel, the pattern corresponding to the component that is adjacent to the position of the defect may be a Thin Film Transistor (TFT), a Data Line, a Gate Line, and the relevant design sizes of the TFT, the Data Line, and the Gate line, such as the design size of the Channel in the TFT, the width of the Data Line, the design pitch, and the like, may be obtained according to the product model to which the bad picture corresponds.

Upon determining the design size of the pattern corresponding to the component that is adjacent to the position of the defect, S103 is performed.

S103: the defect grade of the defect is determined according to the defect type of the defect and a magnitude relationship between the defect size and the design size, where the defect grade is the degree to which the defect affects product yield.

When the bad picture is a bad picture in the display panel, the defect type of the defect in the bad picture includes a particle (PT) defect, a passivation open (PVX open) defect, and the like.

The defect grade may be, for example, bad without quality risk, bad with quality risk, bad and repairable, bad and unrepairable, and the like. Optionally, these defect grades can also be numerated, such as 0 for bad without quality risk, 3 for bad and repairable, 8 for bad and unrepairable, 9 for bad with quality risk: or the defect grades can be graded, such as high, medium, low and non-risk grades, the non-risk grade represents bad without quality risk, the low-risk grade represents bad and repairable, the high-risk grade represents bad and unrepairable, and the high-risk grade represents bad with quality risk. The defect grades can be designed according to actual requirements without being limited to the examples described above.

In an embodiment provided by the present disclosure, the defect grade of the defect in the bad picture is determined according to the defect type of the defect and a magnitude relationship between the defect size and the design size may be achieved by the following mode: by a neural network model in an automatic defect classification (ADC) system, a defect type of the defect in the bad picture is determined, and a determination condition of the defect grade used for the defect in the bad picture is determined: a ratio of the defect size to the design size is compared with a set magnification by the determination condition to obtain a determination result; and the defect grade is determined according to the determination result.

In an embodiment provided by the present disclosure, the defect type to which the defect in the bad picture belongs is determined by the neural network model in the ADC system, and the user is usually required to train the model (such as the neural network model) with the collected sample pictures, and after the training is completed and reaches the on-line use standard, the trained model is adopted to automatically obtain the bad picture from a specific storage position (such as a shared disk dedicated to storing the bad picture output after AOI), and the bad picture is classified, and the classified picture can be marked according to the defect type (such as the particle defect or the passivation open defect).

To train the neural network model, it is usually necessary to collect enough different kinds of sample pictures, mark the sample pictures according to their types, then divide the sample pictures into a training set and a verification set, train the model with the training set, and verify the trained model with the verification set. At the same time, the user also manually judges the bad pictures in the verification set, and determines the accuracy and recall rate of the trained model based on the result of manual judgment. When the accuracy and recall rate reach their respective preset values, it is determined that the model is successfully trained and can perform automatic identification on line. If any one does not reach the corresponding preset value, the samples are added for retraining and verification until the accuracy rate and recall rate reach their respective preset values.

After the trained model goes online, it will automatically obtain bad pictures taken by AOI from a specific storage position for identification, and output a corresponding confidence level after automatic identification of each picture. The confidence level greater than 90% can be determined as the correct judgment of defect classification. If the confidence level is greater than 90%, bad pictures can enter the defect positioning, labeling and classification links, and if the confidence level is less than 90%, the bad features of the bad pictures are determined and extracted manually, and then the trained model is updated and iterated with these bad pictures to improve the subsequent recognition ability of the algorithm for bad pictures. The trained model is the on-line neural network model used in the ADC system, which can be used to classify bad pictures to determine whether the defect types of bad pictures are PT defects or PVX Open defects.

In an embodiment provided by the present disclosure, upon determining the defect type to which the defect in the bad picture belongs, a determination condition of the defect grade used for the defect in the bad picture may be determined, and a corresponding determination condition of the defect grade may be set in advance for each defect type: when the detected product is the display panel, and the defect type is the PT defect, it is determined that the determination condition of the PT defect is used for the bad picture, and the value range of the set magnification is 1.3 to 1.7. Preferably, the set magnification may be 1.5.

The determination condition of the PT defect may be: when the pattern around the position of the defect is a pattern corresponding to a channel of a thin film transistor (TFT), the defect grade is determined to be bad with quality risk if a ratio of a defect size to a design size of the channel is less than or equal to a set magnification; if the ratio of the defect size to the design size of the channel is greater than the set magnification, the defect grade is determined to be bad without quality risk.

Figure 3:
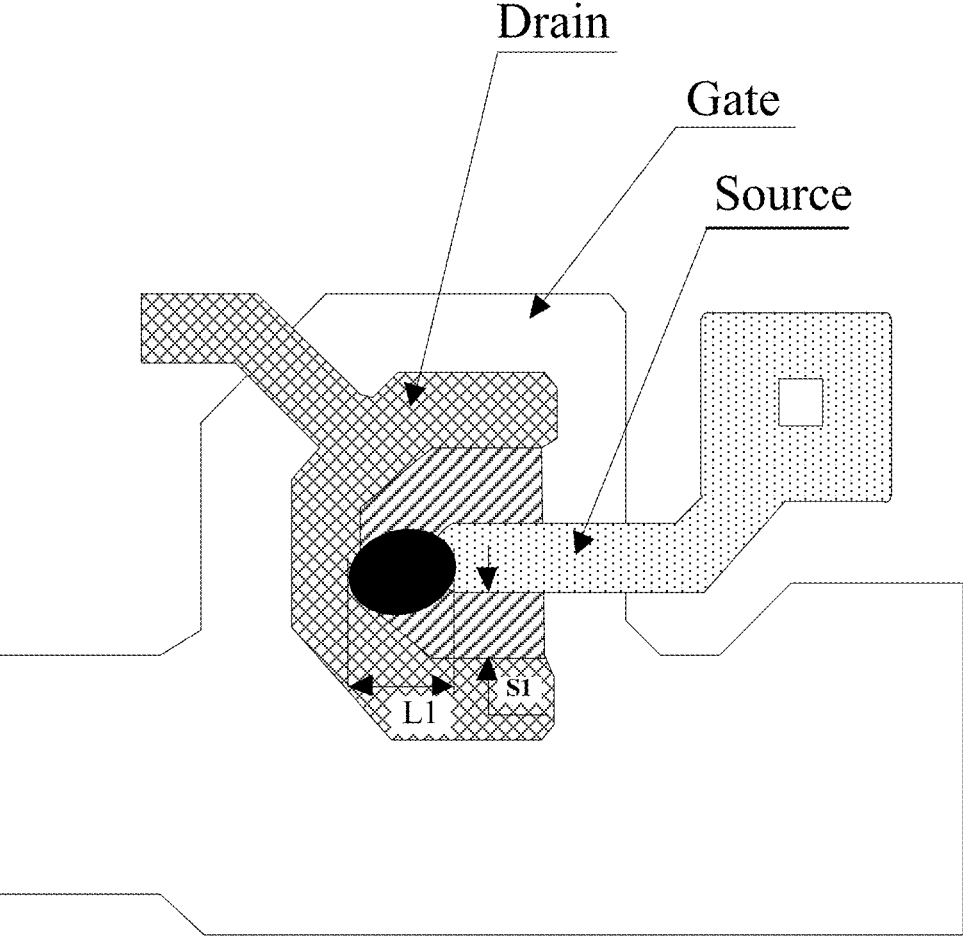
FIG. 3 is a schematic diagram of a particle defect in a channel of a thin film transistor according to an embodiment of the present disclosure.

FIG. 3 is a schematic diagram of a particle defect in a channel of a thin film transistor according to an embodiment of the present disclosure. It is assumed that the defect in FIG. 3 is determined by ADC and is a PT defect, a set magnification is 1.5, the defect size of the PT defect in FIG. 3 is L1, and the design size of the channel of the TFT (the U-shaped region with slashes in FIG. 3, i.e., the vertical space corresponding to the U-shaped region above the gate and between the source and drain of the TFT) is S1, the defect grade of the PT defect in FIG. 3 can be determined to be bad with quality risk when $X1/S1 \leq 1.5$ and the defect grade of the PT defect in FIG. 3 can be determined to be bad without quality risk when $X1/S1 > 1.5$.

When the pattern around the position of the defect is a pattern corresponding to an intersection of gate lines and data lines of the display panel, it is determined that the defect grade is bad with quality risk if the defect is black and a ratio of a defect size to a design size of the intersection is less than or equal to a set magnification; if the ratio of the defect size to the design size of the intersection is greater than the set magnification, it is determined that the defect grade is bad without quality risk.

Figure 4:
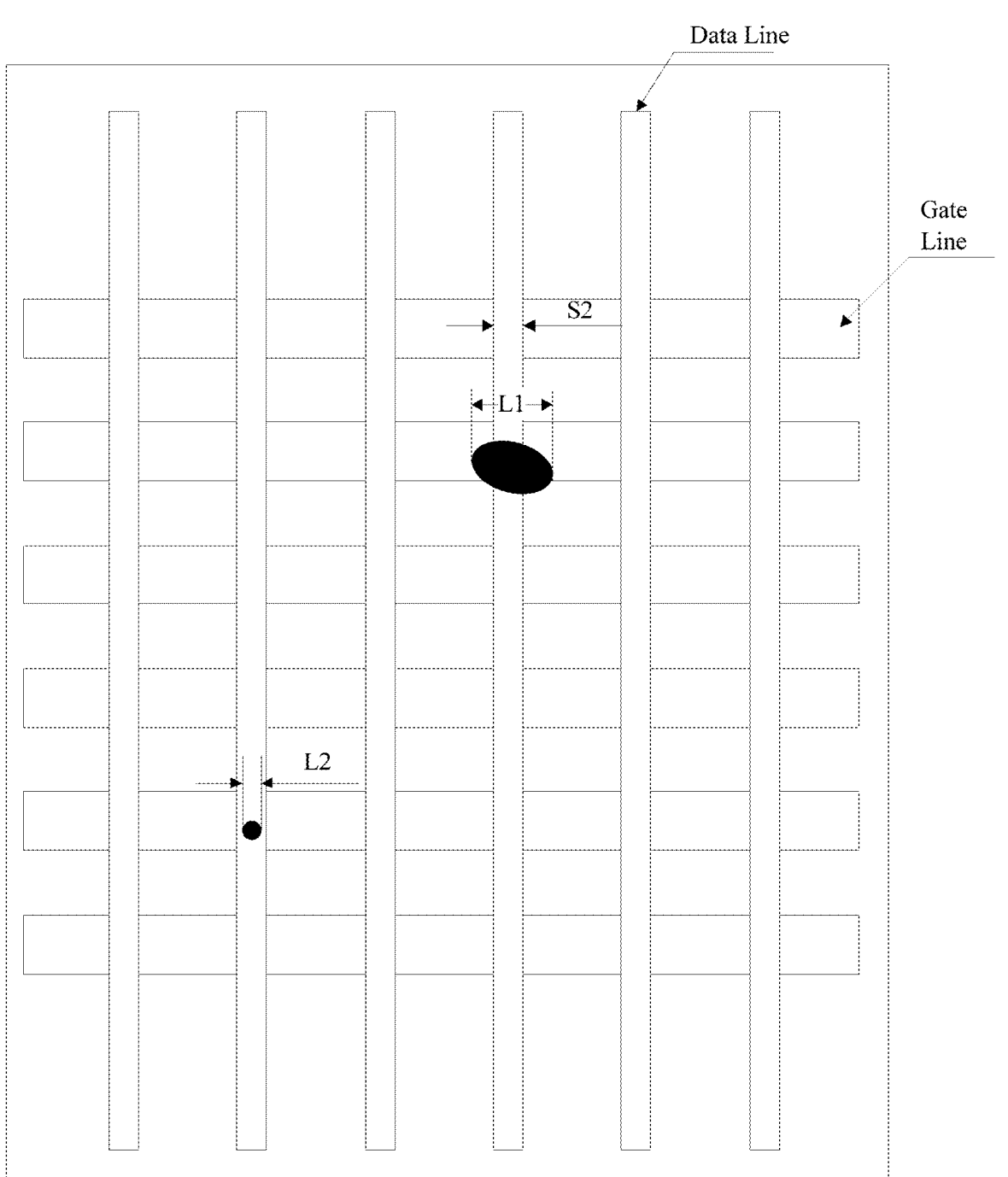
FIG. 4 is a schematic diagram of a particle defect at an intersection of gate lines and data lines according to an embodiment of the present disclosure.

For example, FIG. 4 is a schematic diagram of a particle defect at an intersection of gate lines and data lines according to an embodiment of the present disclosure. Assuming that it is determined by ADC that FIG. 4 belongs to the PT defect, a set magnification is 1.5, in FIG. 4, the defect size of the elliptical PT defect is L1, the defect size of the circular PT defect is L2, and the design size of the intersection is S2, in FIG. 4 L2 is less than S2 (satisfying $L2/S2 \leq 1.5$), it is thus possible to determine that the defect grade of the circular PT defect in the intersection in FIG. 4 is bad with quality risk: L1/S2 is greater than 1.5 in FIG. 4, it is thus possible to determine that the defect grade of the ellipsoidal PT defect at the intersection in FIG. 4 is bad without quality risk.

When the defect type is the PVX Open defect, the determination condition of the PVX Open defect is used for the defect in the bad picture, the set magnification is in the value range of 0.8 to 1.2. Preferably, the set magnification takes a value of 1.

The determination condition of the PVX Open defect may be: when a pattern around the position of the defect is a pattern corresponding to data lines in the display panel, if a ratio of the defect size to a design spacing between two adjacent data lines is less than or equal to the set magnification, it is determined that the defect grade is bad and repairable; and if a ratio of the defect size to the design spacing between the two adjacent data lines is greater than the set magnification, it is determined that the defect grade is bad and unrepairable.

Figure 5:
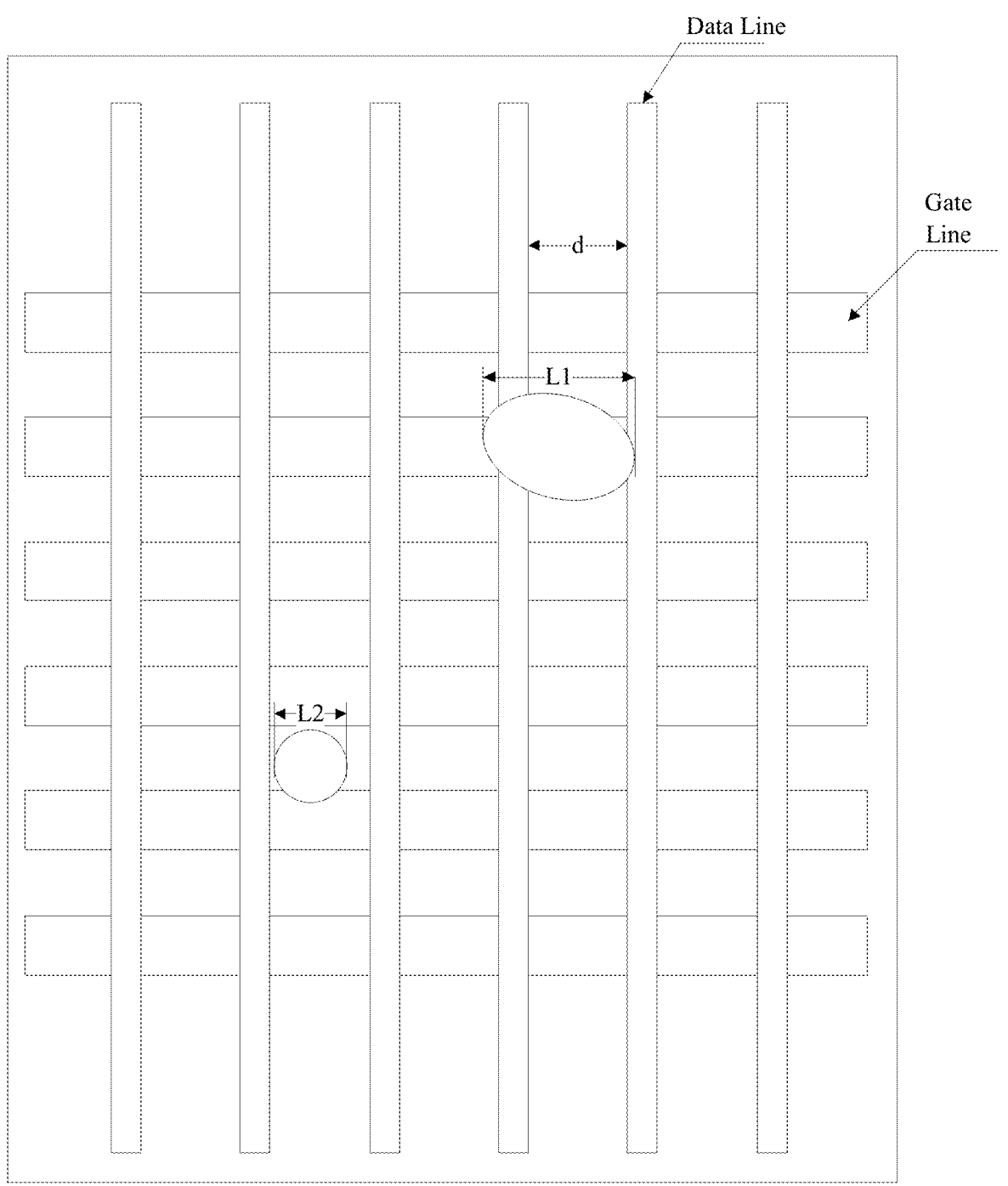
FIG. 5 is a schematic diagram of a particle defect being a passivation open defect according to an embodiment of the present disclosure.

For example, FIG. 5 is a schematic diagram of a particle defect being a passivation open defect according to an embodiment of the present disclosure. Assuming that the defect in FIG. 5 is determined by ADC and belongs to the PVX Open defect, the set magnification is 1, in FIG. 5 the spacing between the two data lines is d, the defect size for the elliptical PVX Open defect is L1, and the defect size for the circular PVX Open defect is L2, in FIG. 5 the defect grade for the elliptical PT defect can be determined to be bad and unrepairable since L1>d: in FIG. 5, the defect grade for the circular PT defect can be determined to be bad and repairable since L2<d.

It should be noted that since the passivation layer is usually above the data lines, it can be understood in FIG. 5 that the passivation layer is transparent, the circle and ellipse in FIG. 5 illustrate the opens present in the passivation layer.

In an embodiment provided by the present disclosure, after determining the defect grade of the bad picture, the defects of different defect grades can be labeled with different labels. Further, bad pictures may also be placed apart by defect grades. For example, if it is a bad and unrepairable picture, then the label of the ADC is used: other defect grades are re-labeled, if the defect grade in the bad picture is bad and repairable, a red round box is used to label.

It should be understood that the above-described solution provided by the present disclosure may also be applied to other technical fields, such as automatic identification of defect grades in PCBs, which can be realized by changing defect grade determination conditions.

Figure 6:
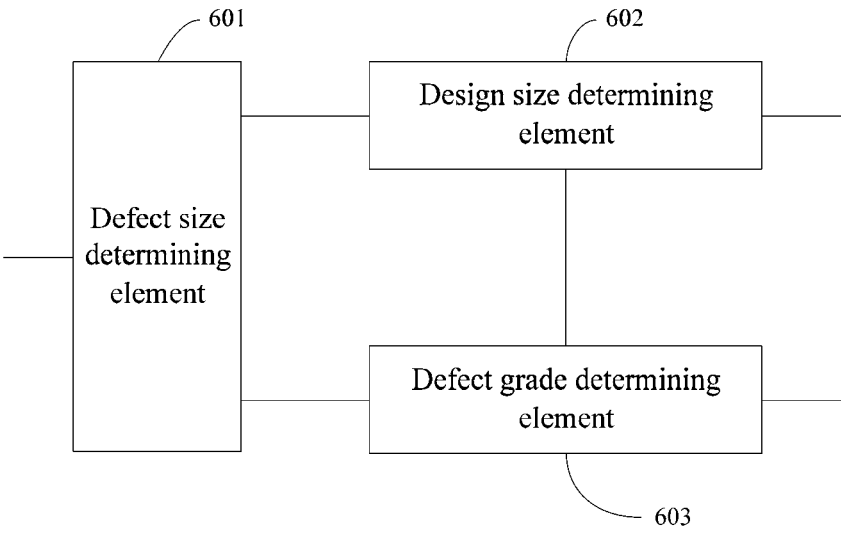
FIG. 6 is a structural diagram of defect grade identification of a bad picture according to an embodiment of the present disclosure.

Based on the same inventive concept, an embodiment of the present disclosure provides an apparatus for identifying the defect grade of a bad picture, the specific implementation modes of the method for automatically identifying the defect grade of the bad picture of the apparatus can refer to the description of the method embodiments, which is not repeated herein. Referring to FIG. 6, the apparatus includes: a defect size determining element 601 used for determining a defect size of a defect from the bad picture: a design size determining element 602 used for according to a product model corresponding to the bad picture, determining a design size of a pattern corresponding to a component that is adjacent to a position of the defect; and a defect grade determining element 603 used for determining the defect grade of the defect according to a defect type of the defect and a magnitude relationship between the defect size and the design size, wherein the defect grade is a degree to which the defect affects product yield.

In a possible implementation mode, the defect size determining element is used for: determining a maximum length of the defect in a first direction and a second direction as the defect size, where the first direction is perpendicular to the second direction.

In a possible implementation mode, the defect grade determination unit 603 is used for: determining, by a neural network model in an automatic defect classification system, the defect type of the defect, and determining a determination condition of the defect grade used for the defect: obtaining a determination result by comparing a ratio of the defect size to the design size with a set magnification according to the determination condition; and determining the defect grade according to the determination result.

In a possible implementation mode, when the bad picture is a bad picture in a display panel, the defect type includes a particle defect and a passivation open defect.

In a possible implementation mode, the defect grade determining element 603 is further used for: when the defect type is the particle defect, determining to use a determination condition of the particle defect for the bad picture, where a value of the set magnification ranges from 1.3 to 1.7; and when the defect type is the passivation open defect, determining to use a determination condition of the passivation open defect for the bad picture, where a value of set magnification ranges from 0.8 to 1.2.

In a possible implementation mode, the determination condition of the particle defect includes: when a pattern around the position of the defect is a pattern corresponding to a channel of a thin film transistor, if a ratio of the defect size to a design size of the channel is less than or equal to the set magnification, it is determined that the defect grade is bad with quality risk; if the ratio of the defect size to the design size of the channel is greater than the set magnification, it is determined that the defect grade is bad without quality risk; and when a pattern around the position of the defect is a pattern corresponding to an intersection of gate lines and data lines of the display panel, if the defect is black and a ratio of the defect size to a design size of the intersection is less than or equal to the set magnification, it is determined that the defect grade is bad with quality risk; if the ratio of the defect size to the design size of the intersection is greater than the set magnification, it is determined that the defect grade is bad without quality risk.

In a possible implementation mode, the determination condition of the passivation open defect includes: when a pattern around the position of the defect is a pattern corresponding to data lines in the display panel, if a ratio of the defect size to a design spacing between two adjacent data lines is less than or equal to the set magnification, it is determined that the defect grade is bad and repairable; and if a ratio of the defect size to the design spacing between the two adjacent data lines is greater than the set magnification, it is determined that the defect grade is bad and unrepairable.

In a possible implementation mode, the defect grade determining element 603 is further used for: labeling defects of different defect grades with different labels.

Based on the same inventive concept, an apparatus for automatically identifying the defect grade of a bad picture is provided in an embodiment of the present disclosure, including: at least one processor, and a memory connected with the at least one processor: wherein the memory stores instructions that are executable by the at least one processor and the at least one processor performs the method for identifying the defect grade of a bad picture by executing the instructions stored by the memory.

Based on the same inventive concept, an embodiment of the present disclosure also provides a readable storage medium including: a memory, used for storing instructions that, when executed by a processor, cause an apparatus including the readable storage medium to perform the method for identifying the defect grade of a bad picture as described above.

Those skilled in the art will appreciate that the embodiment of the present disclosure may be provided as a method, a system or a computer program product. Thus, the embodiment of the present disclosure may take the form of an entirely hardware embodiment, an entirely software embodiment, or an embodiment combining software and hardware aspects. Further, the embodiment of the present disclosure may take the form of a computer program product implemented on one or more computer-usable storage media (including, but not limited to, a disk storage, a CD-ROM, an optical memory, etc.) containing computer-usable program code therein.

The embodiments of the present disclosure are described with reference to flowcharts and/or block diagrams of the method, apparatus (system) and computer program product according to the embodiment of the disclosure. It will be understood that each flow and/or block in the flowcharts and/or block diagrams, and combinations of the flows and/or blocks in the flowcharts and/or block diagrams, can be implemented by computer program instructions. These computer program instructions may be provided to a processor of a general purpose computer, a special purpose computer, an embedded processor, or any programmable data processing device to generate a machine such that instructions executed by the processor of the computer or any other programmable data processing device generate an apparatus for performing the functions specified in one or more flows in the flowcharts and/or one or more blocks of the block diagrams.

These computer program instructions may also be stored in a computer-readable memory that can direct the computer or any other programmable data processing device to function in a particular manner, the instructions stored in the computer-readable memory are caused to produce an article of manufacture including an instruction apparatus which implement the functions specified in one or more flows in the flowcharts and/or one or more blocks of the block diagrams.

These computer program instructions may also be loaded onto a computer or other programmable data processing devices, so that a series of operational steps are performed on the computer or other programmable devices to produce a computer-implemented process such that the instructions which execute on the computer or other programmable devices provide steps for implementing the functions specified in one or more flows in the flowcharts and/or one or more blocks of the block diagrams.

It will be apparent to those skilled in the art that various modifications and variations can be made to the present disclosure without departing from the spirit and scope of the disclosure. Thus, the present disclosure is also intended to encompass such modifications and variations to the extent that they fall within the scope of the claims of the present disclosure and their equivalents.

What is claimed is:

1. A method for identifying a defect grade of a bad picture, comprising:

determining a defect size of a defect from the bad picture;

according to a product model corresponding to the bad picture, determining a design size of a pattern corresponding to a component that is adjacent to a position of the defect; and determining the defect grade of the defect according to a defect type of the defect and a magnitude relationship between the defect size and the design size, wherein the defect grade is a degree to which the defect affects product yield;

wherein the determining the defect grade of the defect according to the defect type of the defect and the magnitude relationship between the defect size and the design size, comprises:

determining the defect type of the defect by a neural network model in an automatic defect classification system, and determining a determination condition of the defect grade used for the defect; wherein in a case that the bad picture is a bad picture in a display panel, the defect type comprises a particle defect and a passivation open defect;

obtaining a determination result by comparing a ratio of the defect size to the design size with a set magnification according to the determination condition; and determining the defect grade according to the determination result;

wherein the determining the defect type of the defect by the neural network model in the automatic defect classification system, and determining the determination condition of the defect grade used for the defect, comprises:

in a case that the defect type is the particle defect, determining to use a determination condition of the particle defect for the bad picture, wherein a value of the set magnification ranges from 1.3 to 1.7;

in a case that the defect type is the passivation open defect, determining to use a determination condition of the passivation open defect for the bad picture, wherein a value of the set magnification ranges from 0.8 to 1.2.

2. The method according to claim 1, wherein the determining the defect size of the defect from the bad picture, comprises:

determining a maximum length of the defect in a first direction and a second direction as the defect size, wherein the first direction is perpendicular to the second direction.

3. The method according to claim 1, wherein the determination condition of the particle defect comprises:

in a case that a pattern around the position of the defect is a pattern corresponding to a channel of a thin film transistor, if a ratio of the defect size to a design size of the channel is less than or equal to the set magnification, determining that the defect grade is bad with quality risk; if the ratio of the defect size to the design size of the channel is greater than the set magnification, determining that the defect grade is bad without quality risk; and in a case that a pattern around the position of the defect is a pattern corresponding to an intersection of gate lines and data lines of the display panel, if the defect is black and a ratio of the defect size to a design size of the intersection is less than or equal to the set magnification, determining that the defect grade is bad with quality risk; if the ratio of the defect size to the design size of the intersection is greater than the set magnification, determining that the defect grade is bad without quality risk.

4. The method according to claim 1, wherein the determination condition of the passivation open defect comprises:

in a case that a pattern around the position of the defect is a pattern corresponding to data lines in the display panel, if a ratio of the defect size to a design spacing between two adjacent data lines is less than or equal to the set magnification, determining that the defect grade is bad and repairable; and if a ratio of the defect size to the design spacing between the two adjacent data lines is greater than the set magnification, determining that the defect grade is bad and unrepairable.

5. The method according to claim 1, wherein after determining the defect grade of the bad picture, the method further comprises:

labeling defects of different defect grades with different labels.

6. An apparatus for identifying a defect grade of a bad picture, comprising:

at least one processor, and a memory connected with the at least one processor;

wherein the memory stores instructions that are executable by the at least one processor and the at least one processor is configured to execute the instructions stored in the memory to perform:

determining a defect size of a defect from the bad picture;

according to a product model corresponding to the bad picture, determining a design size of a pattern corresponding to a component that is adjacent to a position of the defect; and determining the defect grade of the defect according to a defect type of the defect and a magnitude relationship between the defect size and the design size, wherein the defect grade is a degree to which the defect affects product yield;

wherein the at least one processor is further configured to execute the instructions stored in the memory to perform:

determining the defect type of the defect by a neural network model in an automatic defect classification system, and determining a determination condition of the defect grade used for the defect; wherein in a cast that the bad picture is a bad picture in a display panel, the defect type comprises a particle defect and a passivation open defect;

obtaining a determination result by comparing a ratio of the defect size to the design size with a set magnification according to the determination condition; and determining the defect grade according to the determination result;

wherein the at least one processor is further configured to execute the instructions stored in the memory to perform:

in a case that the defect type is the particle defect, determining to use a determination condition of the particle defect for the bad picture, wherein a value of the set magnification ranges from 1.3 to 1.7;

in a case that the defect type is the passivation open defect, determining to use a determination condition of the passivation open defect for the bad picture, wherein a value of the set magnification ranges from 0.8 to 1.2.

7. The apparatus according to claim 6, wherein the at least one processor is further configured to execute the instructions stored in the memory to perform:

determining a maximum length of the defect in a first direction and a second direction as the defect size, wherein the first direction is perpendicular to the second direction.

8. The apparatus according to claim 6, wherein the determination condition of the particle defect comprises:

in a case that a pattern around the position of the defect is a pattern corresponding to a channel of a thin film transistor, if a ratio of the defect size to a design size of the channel is less than or equal to the set magnification, determining that the defect grade is bad with quality risk; if the ratio of the defect size to the design size of the channel is greater than the set magnification, determining that the defect grade is bad without quality risk; and in a case that a pattern around the position of the defect is a pattern corresponding to an intersection of gate lines and data lines of the display panel, if the defect is black and a ratio of the defect size to a design size of the intersection is less than or equal to the set magnification, determining that the defect grade is bad with quality risk; if the ratio of the defect size to the design size of the intersection is greater than the set magnification, determining that the defect grade is bad without quality risk.

9. The apparatus according to claim 6, wherein the determination condition of the passivation open defect comprises:

in a case that a pattern around the position of the defect is a pattern corresponding to data lines in the display panel, if a ratio of the defect size to a design spacing between two adjacent data lines is less than or equal to the set magnification, determining that the defect grade is bad and repairable; and if a ratio of the defect size to the design spacing between the two adjacent data lines is greater than the set magnification, determining that the defect grade is bad and unrepairable.

10. The apparatus according to claim 6, wherein the at least one processor is further configured to execute the instructions stored in the memory to perform:

labeling defects of different defect grades with different labels.

11. A non-transitory computer-readable storage medium, comprising a memory, the memory being configured for storing instructions that, when executed by a processor, cause an apparatus comprising the non-transitory computer-readable storage medium to perform:

determining a defect size of a defect from the bad picture;

according to a product model corresponding to the bad picture, determining a design size of a pattern corresponding to a component that is adjacent to a position of the defect; and determining the defect grade of the defect according to a defect type of the defect and a magnitude relationship between the defect size and the design size, wherein the defect grade is a degree to which the defect affects product yield;

wherein the instructions, when executed by the processor, further cause the apparatus comprising the non-transitory computer-readable storage medium to perform:

determining the defect type of the defect by a neural network model in an automatic defect classification system, and determining a determination condition of the defect grade used for the defect; wherein in a case that the bad picture is a bad picture in a display panel, the defect type comprises a particle defect and a passivation open defect;

obtaining a determination result by comparing a ratio of the defect size to the design size with a set magnification according to the determination condition; and determining the defect grade according to the determination result;

wherein the instructions, when executed by the processor, further cause the apparatus comprising the non-transitory computer-readable storage medium to perform:

in a case that the defect type is the particle defect, determining to use a determination condition of the particle defect for the bad picture, wherein a value of the set magnification ranges from 1.3 to 1.7;

in a case that the defect type is the passivation open defect, determining to use a determination condition of the passivation open defect for the bad picture, wherein a value of the set magnification ranges from 0.8 to 1.2.

12. The non-transitory computer-readable storage medium according to claim 11, wherein the instructions, when executed by the processor, further cause the apparatus comprising the non-transitory computer-readable storage medium to perform:

determining a maximum length of the defect in a first direction and a second direction as the defect size, wherein the first direction is perpendicular to the second direction.

* * * * *